United States Patent [19]

Schutz

[11] Patent Number: 5,467,884
[45] Date of Patent: Nov. 21, 1995

[54] METAL CONTAINER FOR TRANSPORT AND STORAGE OF LIQUIDS

[75] Inventor: udo Schutz, Selters, Germany

[73] Assignee: Schutz-Werke GmbH & Co. KG, Selters, Germany

[21] Appl. No.: 353,350

[22] Filed: Dec. 5, 1994

[30] Foreign Application Priority Data

Dec. 4, 1993 [DE] Germany ................. 43 41 338.2

[51] Int. Cl.⁶ .................................................. B65D 19/00
[52] U.S. Cl. .......................................... 220/1.5; 220/401
[58] Field of Search ........................... 220/453, 1.5, 401, 220/402, 408, 410

[56] References Cited

U.S. PATENT DOCUMENTS

| | | | |
|---|---|---|---|
| 4,173,288 | 11/1979 | Schutz | 220/1.5 |
| 4,795,057 | 1/1989 | Jungels et al. | 220/401 |
| 4,840,284 | 6/1989 | Snyder | 220/1.5 X |
| 4,909,387 | 3/1990 | Schutz | 220/1.5 X |
| 5,110,000 | 5/1992 | Nichols | 220/1.5 X |
| 5,133,476 | 7/1992 | Schutz | 220/1.5 X |
| 5,139,889 | 8/1992 | Imazu et al. | 428/626 |
| 5,201,432 | 4/1993 | Elvin-Jensen | 220/1.5 |
| 5,253,776 | 10/1993 | Decroix et al. | 220/1.5 X |
| 5,358,137 | 10/1994 | Shuert et al. | 220/401 |

*Primary Examiner*—Steven M. Pollard
*Attorney, Agent, or Firm*—Young & Thompson

[57] ABSTRACT

A sheet metal container (1) used as a returnable or nonreturnable container for transport and storage of liquids has a fill neck (3) which can be sealed with a cap (4) and another neck (5) in the bottom area for connecting a discharge and flushing cock, and an external lattice jacket (6) of metal. A pallet (9) is formed as a flat bottom pan (10) from sheet for form-fittingly accommodating the sheet metal container (1) which is equipped with a drainage bottom. The sheet metal container (1) is welded together from a jacket (11), a bottom part (12) and a cover (13). The jacket (11), bottom part (12) and cover (13) of the container (1) are produced with a double wall of composite construction consisting of a thin inner sheet of corrosion-proof special steel and an outer sheet of normal steel with a thickness greater than that of the inner sheet. It is possible to produce the container (1) of clad sheet metal with a thin inner layer of special steel and a thicker outer layer of normal steel.

9 Claims, 8 Drawing Sheets

METAL CONTAINER FOR TRANSPORT AND STORAGE OF LIQUIDS

The invention relates to metal containers for transport and storage of liquids with a sealable fill opening and a discharge and flush opening for connection to a discharge fitting.

The necessity of saving raw materials and legal environmental protection regulations compel the pertinent industry to fill large volume metal containers which can be used as returnable containers and which are offered on the market for transport and storage instead of, as in the past, barrels with a much smaller capacity.

The problem of the invention is to develop a metal container with respect to its use for transport and storage of liquids of all types and to devise a process for economical and cost-favorable production of the metal container.

This problem is solved according to the invention by a metal container with the features of patent claim 1 and a production process according to patent claim 10.

The subclaims contain advantageous and feasible developments of the invention.

The metal container according to the invention which stands on a pallet made preferably of metal can be used for transport and storage of liquids which are needed in industry for the most varied purposes. In particular, the container can be used for transport and storage of combustible liquids. By using a flat bottom pan which is designed as a pallet, which holds the metal container, which is matched to the drainage bottom of the liquid container, and which has a hollow chamber bottom as well as a peripheral, external, hollow support collar the pallet is characterized by good damping behavior and high stiffness both under vibration as well as impact stress so that the metal container completely satisfies high demands with respect to transport and accident safety. Based on the fact that it can be emptied without leaving any residue and that is can be optimally cleaned, which is due to the smoothness of the insides of the jacket, bottom and cover and the transitions between the jacket and bottom part and the jacket and cover which prevents liquid pockets, the container is suited for use in the food industry. The double-walled construction of the inner container with inside sheet metal of special steel as corrosion protection and outside sheet metal of normal steel which exert the support function of the side walls and the bottom of the container allows reduction of the wall thickness of 2.5 to 3 millimeters which is prescribed for corrosion-proof, single wall sheet metal containers by up to 50% to 1.2 to 1.5 millimeters so that a considerable savings of material and reduction of empty weight of the container are achieved. The sheet metal container in conjunction with the metal lattice jacket has great stability which ensures a maximum amount of safety of the container against external impact and shock stresses and multiple stackability of the container. The economic production process for the sheet metal container enables manufacture of cost-favorable containers with high quality.

The invention is explained below using drawings.

Figure 1:
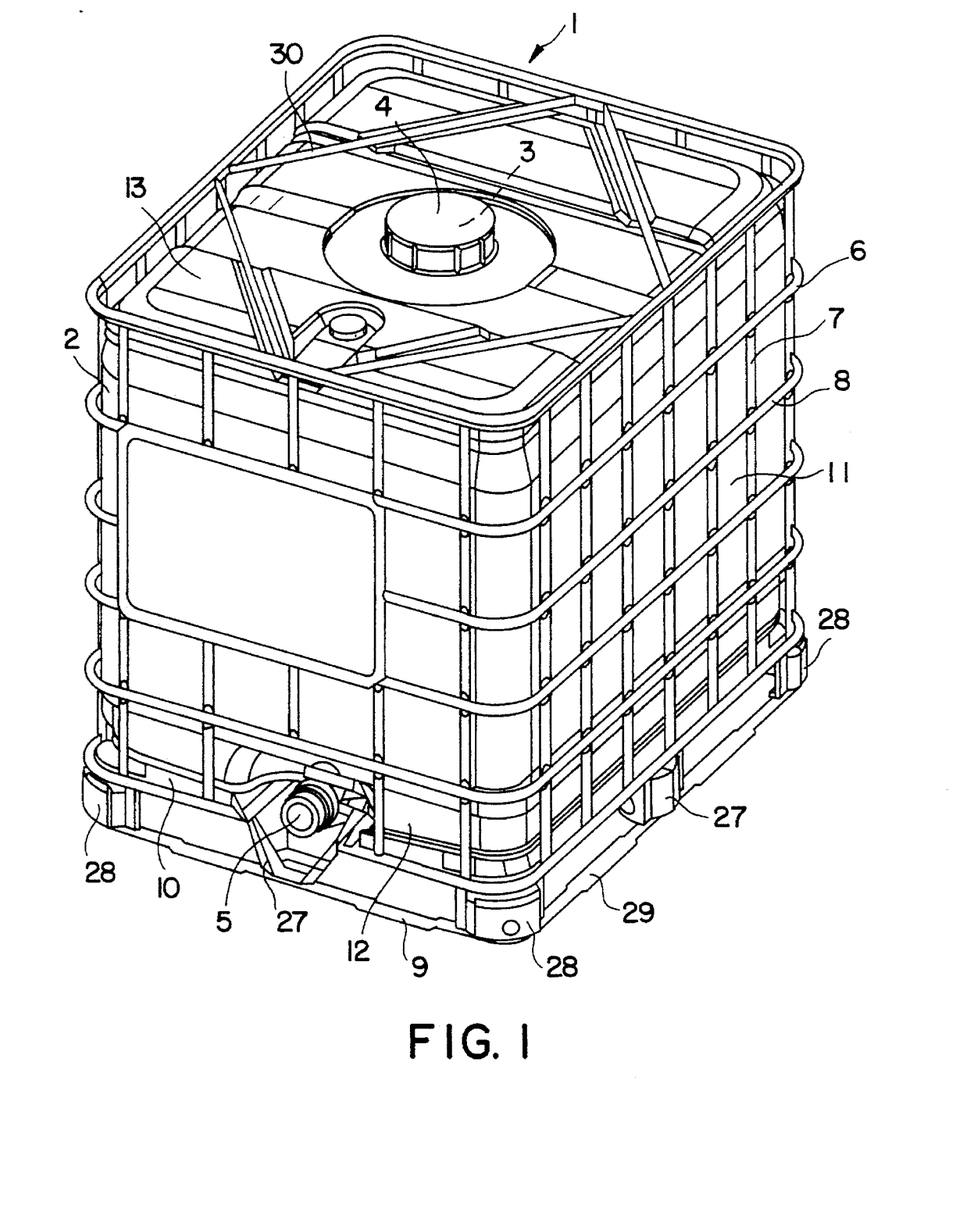
FIG. 1 shows a perspective view of a container of sheet metal with a lattice jacket and a pallet formed as a bottom pan.
Figure 2:
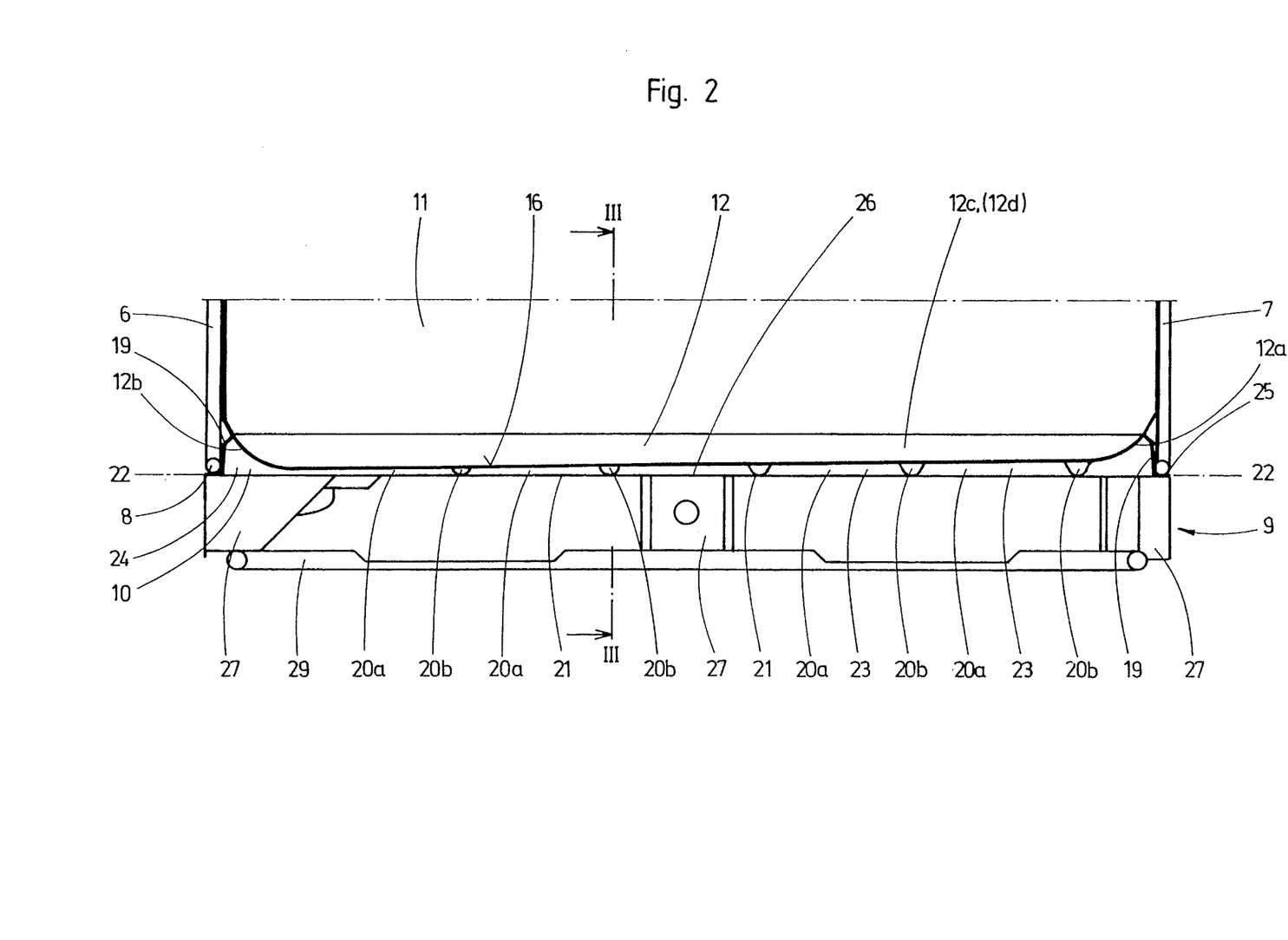
FIG. 2 shows a longitudinal section and FIG. 3 shows a cross section through the bottom area of the container according to the line III—III of FIG. 2 in an enlarged representation.
Figure 3:
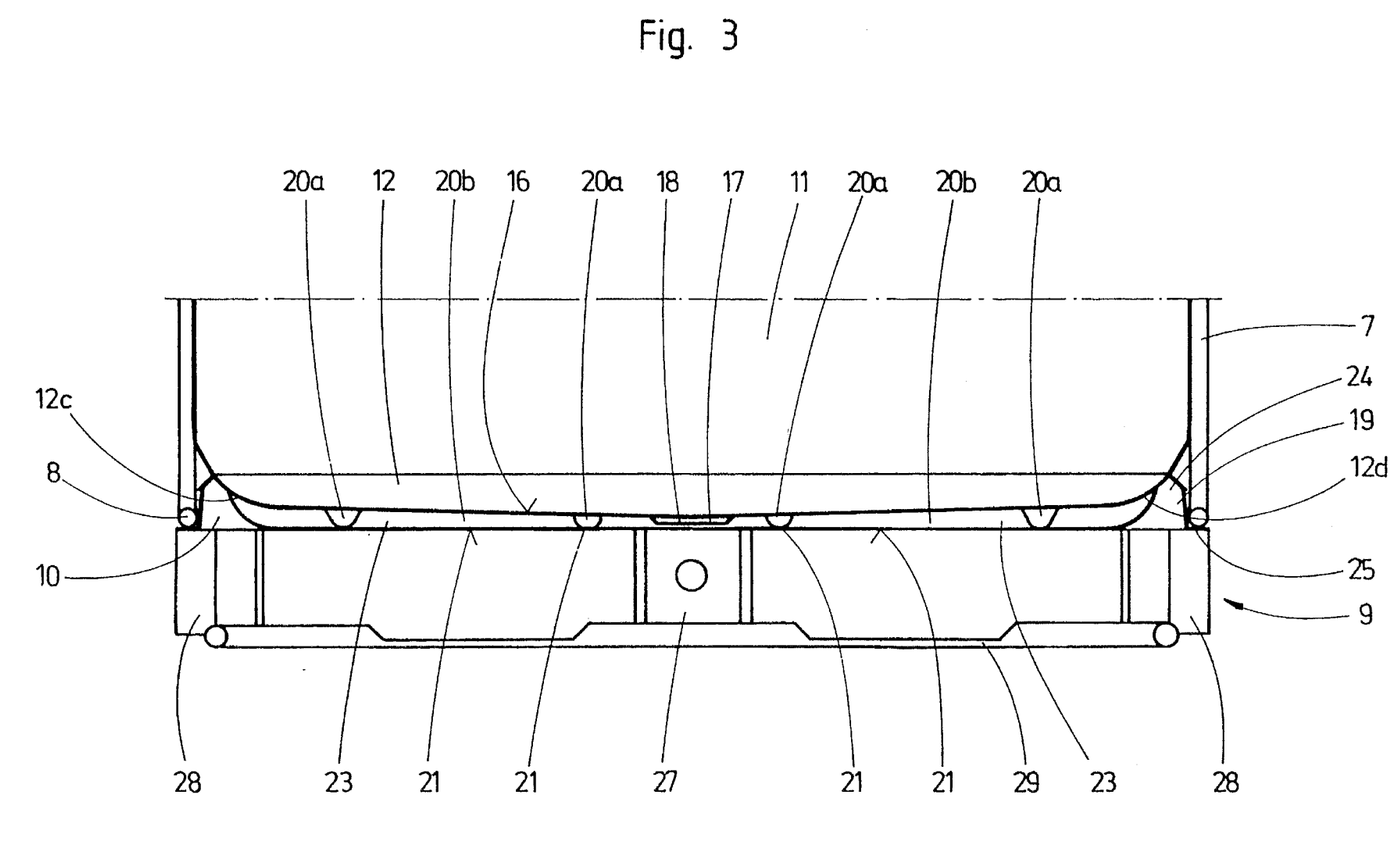

Sheet metal container 1 used as a returnable or nonreturnable container with rectangular layout and rounded corners 2 according to FIGS. 1 through 3 for transport and storage of liquids of various types has filler neck 3 which can be sealed with cap 4 and another neck 5 in the bottom area for connection of a discharge and flushing cock, external lattice jacket 6 of crossing vertical and horizontal lattice rods 7, 8 of metal, and pallet 9 formed as flat bottom pan 10 from sheet metal with length and width measurements for form-fitted accommodation of sheet metal container 1 in agreement with Eurostandards.

Figure 7:
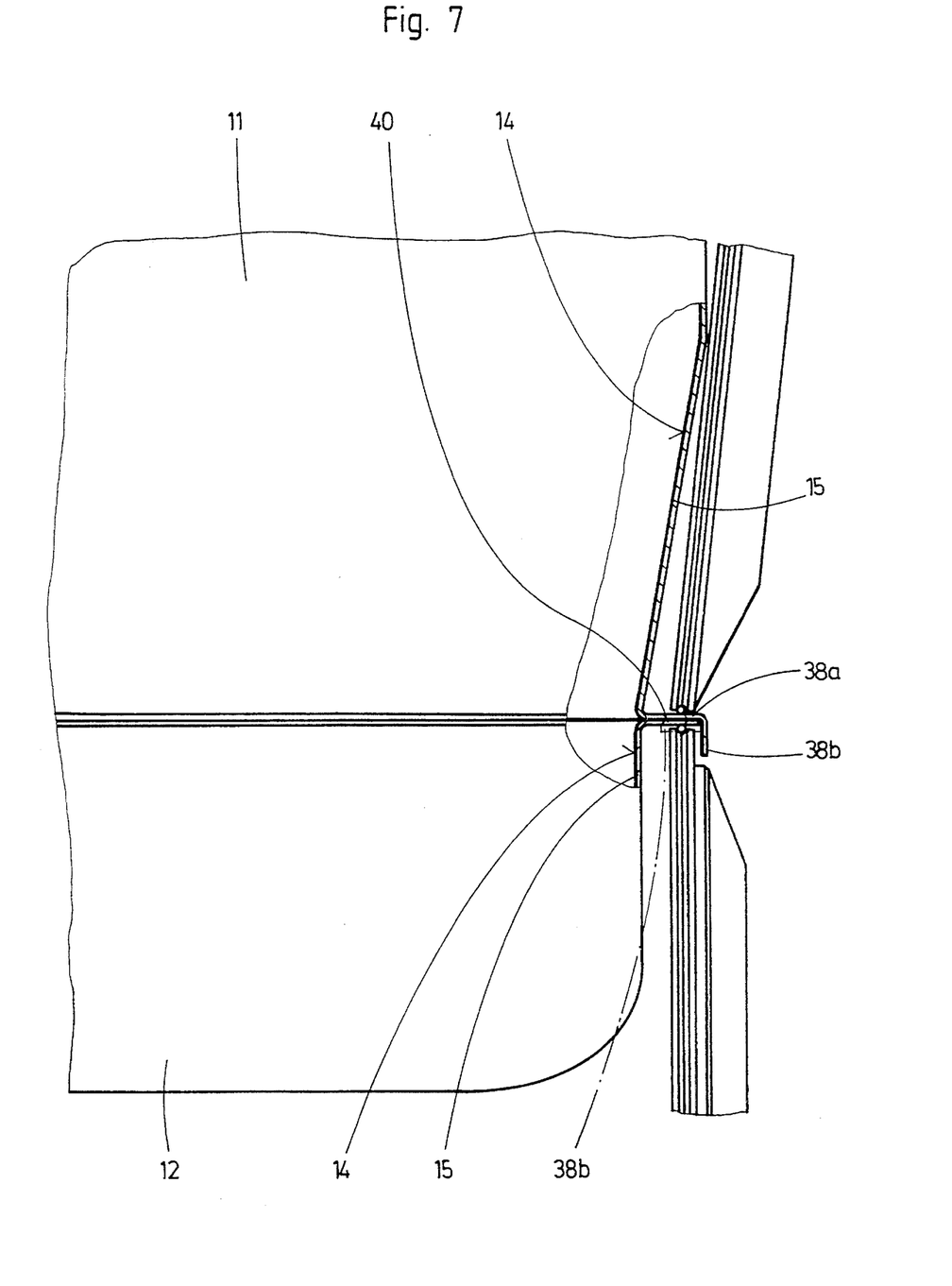
FIGS. 7 and 8 show the joining of the sheet metal jacket to the bottom part and the cover of sheet metal by a seam weld.
Figure 8:
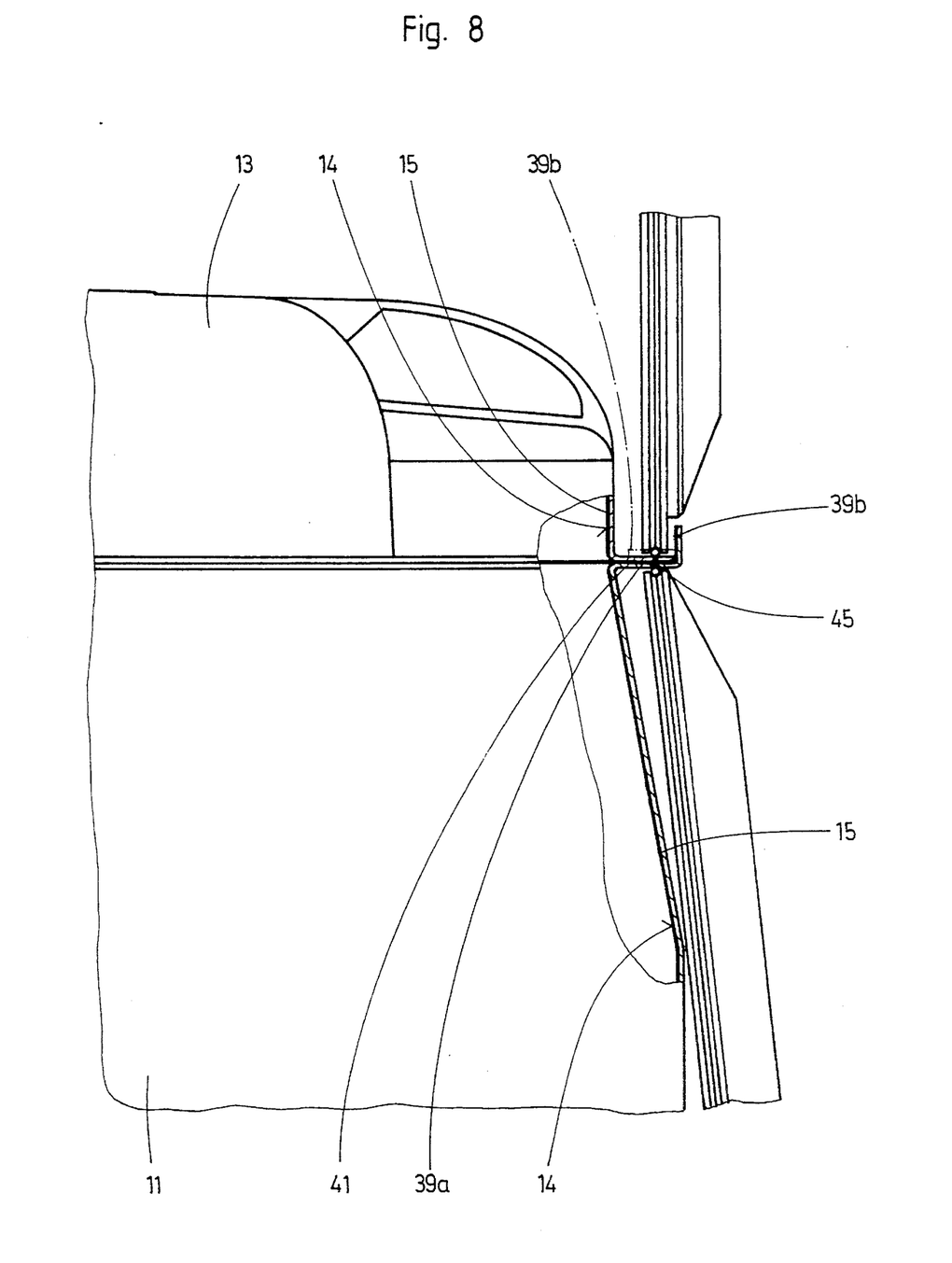

Sheet metal container 1 is welded together from jacket 11, bottom part 12 and cover 13. Jacket 11, bottom part 12 and cover 13 of container 1 produced with double walls in a composite construction consist of thin inner sheet 14 of corrosion-proof special steel and outer sheet 15 of normal steel with a thickness greater than that of inner sheet 14 (FIG. 7 and 8).

In contrast to the embodiment described, jacket 11, bottom part 12 and cover 13 of container 1 also in composite construction can each be manufactured from an inner sheet of special steel, a middle sheet of normal steel and an outer sheet of special steel. Furthermore it is possible to produce container 1 from clad sheet metal with a thin inner layer of special steel and a thicker outer layer of normal steel. Bottom part 12 of container 1 has drainage bottom 16 which runs with a slight gradient from rear edge 12a to front edge 12b of bottom part 12 and which moreover slopes down slightly towards the center of the bottom from two side edges 12c, 12d of bottom part 12. In this way bottom 16 of bottom part 12 of container 1 forms a flat drain channel slightly sloped towards neck 5 in front edge 12b for connecting a discharge and flushing cock, preferably a ball or flap valve.

Bottom pan 10 of pallet 9 which is deep drawn from sheet metal and which is matched in shape with drainage bottom 16 of sheet metal container 1, with flat center trough 18 which corresponds to drain trough 17 of container 1, has outer support edge 19 which is drawn downward and reinforcing beads 20a, 20b which run in the direction of and transverse to center trough 18; bases 21 of the beads lie in common plane 22—22. Reinforcing beads 20a, 20b and center trough 18 form chambers 23 which open downwardly, and external support edge 19 forms a peripheral, hollow support collar 24 on bottom pan 10. Bottom pan 10 of pallet 9 formed in this way is characterized by good damping capacity and high stiffness both under vibrational stress due to driving vibrations transmitted from the transport vehicle and surge vibrations proceeding from the liquid transport material as well as under external impact or shock stress so that container 1 fully satisfies high requirements with respect to the required transport and accident safety.

From outer support edge 19 of bottom pan 10 peripheral external edge strip 25 is bent which forms a subframe with reinforcing strut 26 attached in the center under bottom pan 10.

Lattice jacket 6 fixed by peripheral support collar 24 of bottom pan 10 of pallet 9 is supported with lower, horizontally running lattice rod 8 or a bottom closing section 10 on edge strip 25 of bottom pan 10, and lattice jacket 6 is screwed tight over bottom horizontal lattice rod 8 together with bottom pan 10 as well as middle 27 and corner feet 28 on pallet frame 29 formed as a steel tube frame.

Lattice jacket 6 is reinforced by upper frame 30 screwed to the lattice jacket, the frame protecting sheet metal container 1 from the top.

The modular construction of sheet metal container 1 formed as a pallet container allows simple and quick assembly, if necessary simple replacement of the sheet metal container by a plastic container and space-saving and cost-favorable storage as well as a correspondingly cost-favorable transport of the components.

Figure 4:
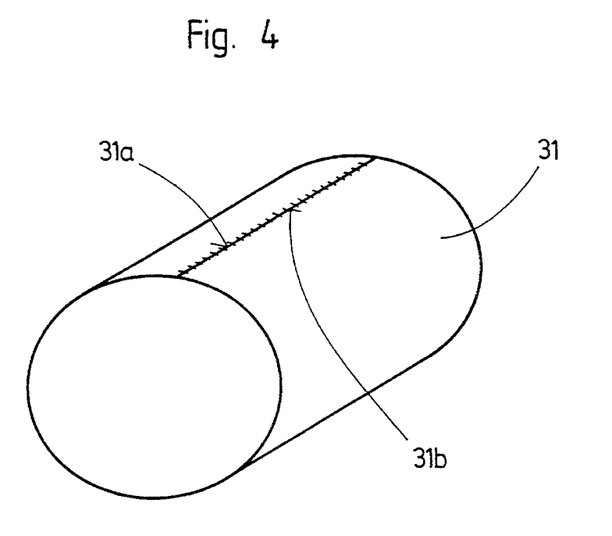
FIGS. 4 through 6 show three process stages in the production of the sheet metal jacket of the container.

To produce double-walled sheet metal jacket 11 of container 1 a rectangular sheet metal blank from one special steel and one normal steel sheet which is not shown is bent into tubular body 31 and then its abutting edges 31a, 31b are welded lengthwise, for example, on a resistance tweezer welder (FIG. 4).

Figure 5:
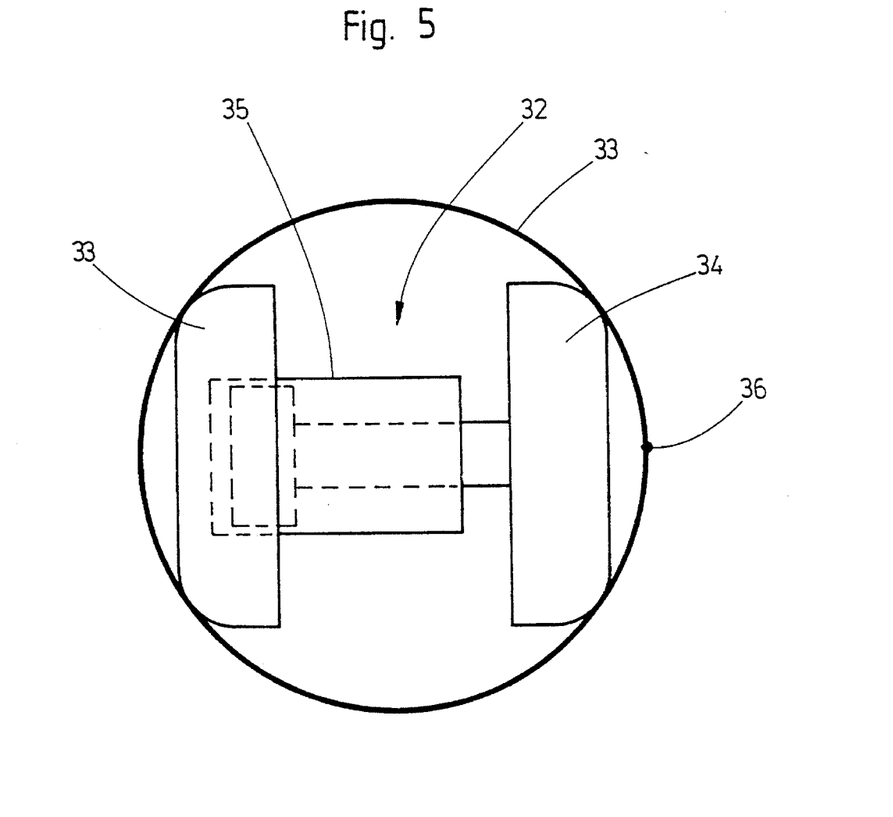
Figure 6:
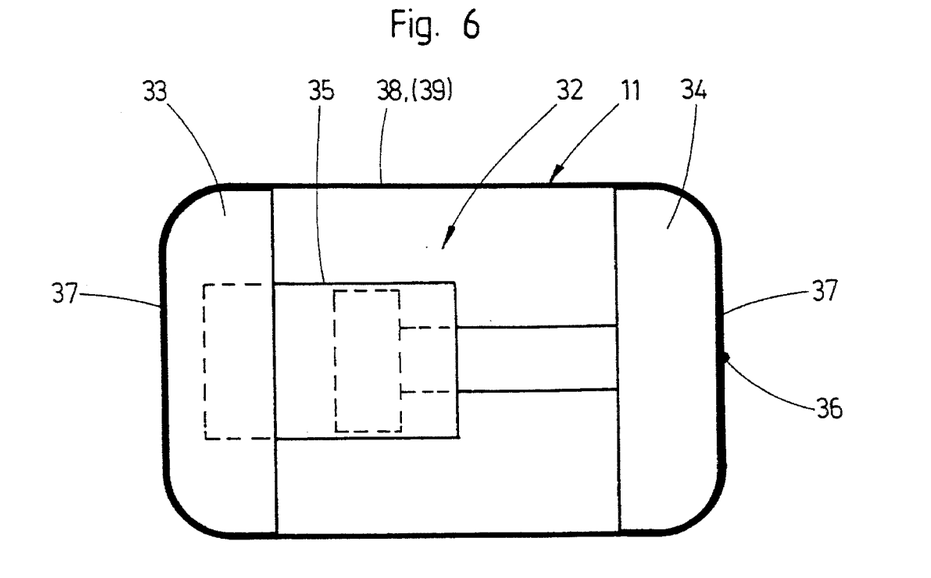

Tubular body 31 is mounted on stretching press 32 with spreading jaws 33, 34 which have the shape of container 1 in the area of its narrow sides (FIG. 5). After mounting tubular body 31 spreading jaws 33, 34 of stretching press 32 are moved apart by hydraulic or pneumatic cylinder 35 (FIG. 6). In doing so tubular body 31 assumes the shape of sheet metal jacket 11. Tubular body 31 is mounted on stretching press 32 such that longitudinal weld 36 comes to rest on one of narrow sides 37 of sheet metal jacket 11.

Then two edges 38, 39 of sheet metal jacket 11 are folded back into weld edges with one horizontal and one vertical edge section 38a, 38b; 39a, 39b.

Afterwards deep-drawn or pressed bottom part 12 with folded back horizontal edge 40 is placed true to size on horizontal edge section 38a of one weld edge of jacket 11 and bottom part 12 is provisionally fastened on jacket 11 (FIG. 7).

In the same way deep-drawn or pressed cover 13 with folded back horizontal edge 41 is placed true to size on horizontal edge section 39a of one weld edge of jacket 11 and cover 13 is provisionally fastened on jacket 11 (FIG. 8). Bottom part 12 and cover 13 are welded, preferably roller seam welded, liquid tight to jacket 11.

Vertical edge sections 38b, 39b of container jacket 11 which project above the folded back horizontal edges 40, 11 of bottom part 12 and cover 13 are mined onto edges 40, 41 of bottom part 12 and cover 13.

In the last stage of the production process annular gaps 42 are eliminated which form between jacket 11 and bottom part 12 or cover 13 of sheet metal container 1 which can form liquid pockets in which liquid collects during draining which can form disease-causing germs when the container is used in the food industry.

These annular gaps 42 can be closed by build-up welding.

Figure 9:
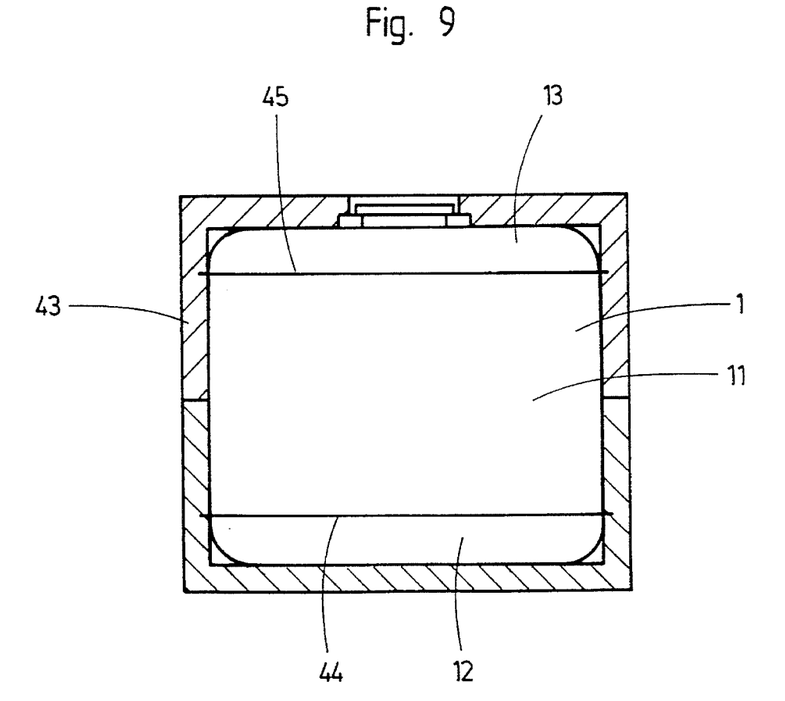
FIG. 9 shows a schematic section of a support form for smoothing the transitions between the jacket and bottom and the jacket and cover of the container.

One other possibility for eliminating annular gaps 42 consists in stretching sheet metal container 1. For this reason container 1 is inserted into a support form 43 which is designed such that upon application of hydraulic or pneumatic pressure to container 1 the transition areas between jacket 11 and bottom part 12 as well as jacket 11 and cover 13 can be stretched to a limited extent, edge sections 38l, 38b, 39a, 39b of jacket 11 and edges 40, 41 of bottom part 12 and cover 13 which project to the outside being clamped from the outside in order to prevent ripping of bottom 44 and cover weld 45 (FIG. 9).

The increased pressure prevailing in sheet metal container 1 is preferably used for testing the integrity of the container.

Figure 10:
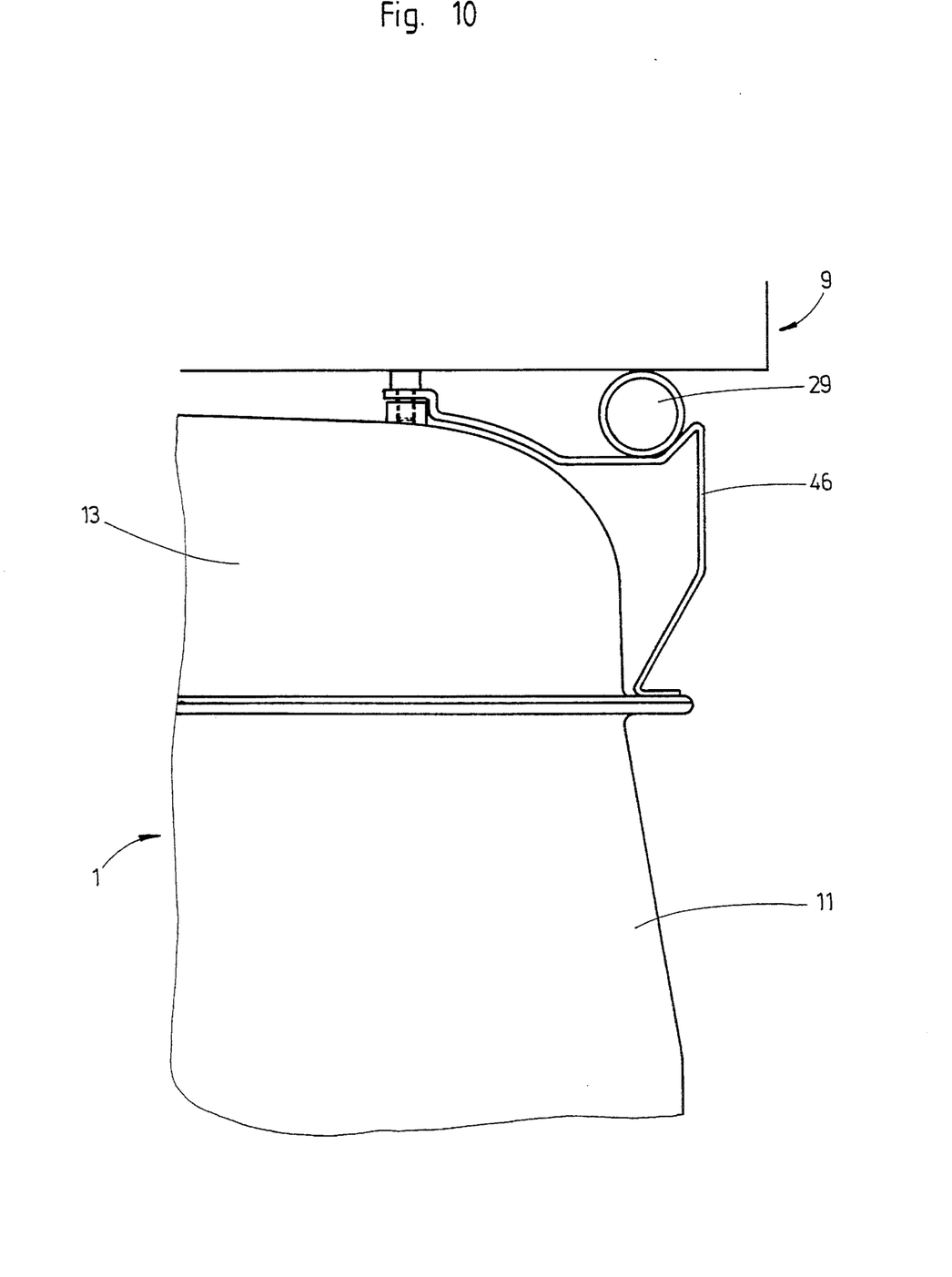
FIG. 10 shows a cover area of a container designed to be self-supporting.

By means of corresponding reinforcement of outer sheet 15 of jacket 11, bottom part 12 and cover 13 container 1 can be made self-supporting so that the container can be used without lattice jacket 11. For stacking purposes support sections 46 are mounted on container cover 13 in its corner areas (FIG. 10).

If necessary, it is possible to equip sheet metal container 1 with an inner container or a flexible inner casing made of plastic.

I claim:

1. A metal container (1) for transport and storage of liquids with a sealable fill opening (3) and a discharge and flush opening for connection to a discharge fitting, the container (1) being welded together to comprise a unitary assembly of a jacket (11), a bottom part (12) with a drainage bottom (16) and a cover (13) of sheet metal, the container standing in a flat bottom pan (10) of sheet metal formed as a pallet (9), the bottom pan (10) matching in shape the drainage bottom (16) of the container (1) and having reinforcing beads (20a, 20b) with bases (21) which lie in a common horizontal plane (22—22) and which form chambers (23) opening downwardly, the flat bottom pan (10) having an outer support edge (19) extending downwardly which forms a hollow support collar (24), and the bottom pan (10) being attached to an underlying pallet frame (29).

2. A container according to claim 1, wherein said drainage bottom (16) has a slight gradient from a rear edge (12a) to a forward edge (12b) of said bottom part (12) in which forward edge (12b) is said flush opening (5).

3. A container according to claim 2, wherein said drainage bottom (16) has a gradient from two side edges (12c, 12d) to a bottom center and forms a center flat drain trough (17).

4. A container according to claim 1, wherein said container (1) is self-supporting and wherein support sections (46) are attached on said container cover (13) for stacking purposes.

5. A container according to claim 1, further comprising an external lattice jacket (11) of metal.

6. A container according to claim 1, further comprising an inner casing of plastic.

7. A container according to claim 1, said container (1) comprising a thin inner layer of corrosion-resistant special steel and a thicker outer layer of normal steel.

8. A container according to claim 1, which is a composite construction of an inner sheet (14) of special steel and at least one outer sheet (15) of normal steel.

9. A container according to claim 1, which is a composite construction of an inner sheet of special steel, a middle sheet of normal steel and an outer sheet of special steel.

\* \* \* \* \*